United States Patent [19]
Roberts

[11] Patent Number: 4,589,303
[45] Date of Patent: May 20, 1986

[54] CONTINUOUSLY VARIABLE TRANSMISSION WITH SYNCHRONOUS SHIFT

[75] Inventor: Richard W. Roberts, Lombard, Ill.

[73] Assignee: Borg-Warner Corporation, Chicago, Ill.

[21] Appl. No.: 643,938

[22] Filed: Aug. 24, 1984

[51] Int. Cl.$^4$ .................................... F16H 37/00
[52] U.S. Cl. ........................ 74/689; 74/695; 74/740
[58] Field of Search ............ 74/689, 695, 700, 740, 74/681; 474/8, 28

[56] References Cited

U.S. PATENT DOCUMENTS

| | | | |
|---|---|---|---|
| 2,546,869 | 3/1951 | Przybylski | 74/689 |
| 2,933,952 | 4/1960 | Schou | 74/689 |
| 3,340,749 | 9/1967 | Magg et al. | 74/689 |
| 3,479,908 | 11/1969 | Kress et al. | 74/681 |
| 3,670,594 | 6/1972 | Roper | 74/689 |
| 3,850,050 | 11/1974 | Lemmens | 74/689 |
| 4,241,618 | 12/1980 | Smirl | 74/695 X |
| 4,304,150 | 12/1981 | Lupo et al. | 74/681 X |
| 4,335,629 | 6/1982 | Falzoni | 74/695 X |
| 4,392,394 | 7/1983 | Hofbauer et al. | 74/689 |
| 4,458,558 | 7/1984 | Frank | 74/689 X |
| 4,481,004 | 11/1984 | Abbott | 474/28 |

FOREIGN PATENT DOCUMENTS

| | | | |
|---|---|---|---|
| 0105515 | 4/1984 | European Pat. Off. | 74/689 |
| 1120235 | 12/1961 | Fed. Rep. of Germany | 74/689 |
| 0049459 | 5/1981 | Japan | 74/689 |

*Primary Examiner*—Kenneth J. Dorner
*Assistant Examiner*—David Novais
*Attorney, Agent, or Firm*—Julian Schachner

[57] ABSTRACT

A continuously variable transmission with synchronous shift includes an input, an output, a fixed-ratio drive mechanism and a variator in driven relationship with the input, a planetary gear assembly having a sun gear, a ring gear, a carrier, and a plurality of planet gears, a first clutch for engaging the variator selectively with the sun and ring gears, a second clutch for engaging the mechanism selectively with the carrier and sun gear and for disengaging the mechanism therefrom, and a third clutch for engaging the ring gear and carrier selectively with the output. This relationship provides the transmission with a plurality of drive ranges and the capability of shifting from any range to any other range at a synchronous shift point established when the variator ratio is equal to the ratio of the mechanism.

12 Claims, 6 Drawing Figures

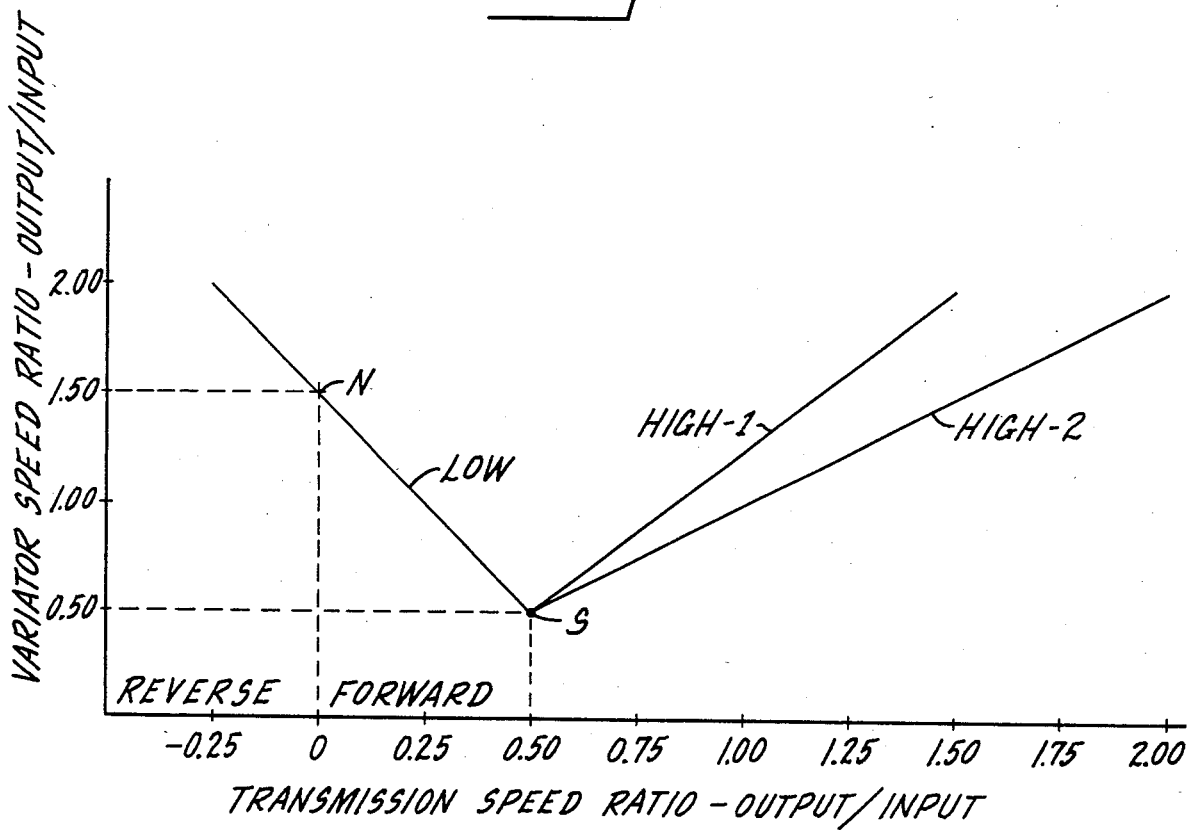
Fig. 2.
Fig. 3.
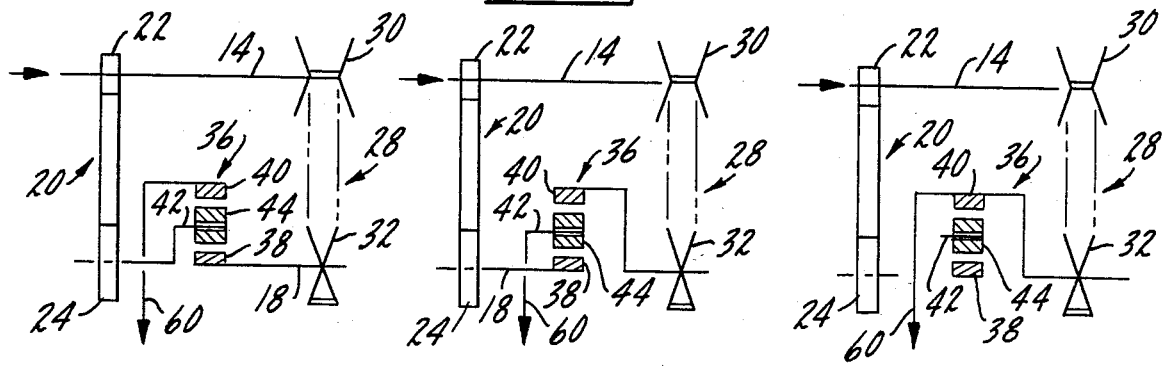
Fig. 4a.  Fig. 4b.  Fig. 4c.

CONTINUOUSLY VARIABLE TRANSMISSION WITH SYNCHRONOUS SHIFT

BACKGROUND OF THE INVENTION

This invention relates generally to a continuously variable transmission (CVT). More particularly, it relates to a CVT adapted for use in a small, front-wheel-drive automotive vehicle. The CVT has a plurality of drive ranges and a synchronous shift point at which it may be shifted from any drive range to any other drive range.

The typical automotive transmission is shifted in descrete steps between a low-speed, high-torque range for starting a vehicle and a high-speed, low-torque range for vehicle operation at highway speeds. In a manual transmission shifting is accomplished by the engagements of gear sets. In an automatic transmission shifting is accomplished by the controlled engagement of friction elements. Because such shifting is in step functions, the most efficient vehicle operation can only be approximated. Automotive engineers have long recognized that efficiency would be improved if the transmission could be adjusted continuously to compensate for changing loads, speeds, etc. This would allow the engine to be operated at maximum efficiency under changing conditions.

CVTs have been known for some time. The typical CVT employs a variable-ratio drive mechanism (variator) including a variable pulley having a pair of flanges mounted on a drive shaft, with one of the flanges being movable with respect to the other so as to change the pulley pitch radius. Another, similar variable pulley is mounted on a driven shaft. A suitable belt or chain couples the pulleys for transferring torque therebetween. When the pitch radius of one pulley is changed, the pitch radius of the other pulley is changed simultaneously in the opposite direction. As a result, the drive ratio between the drive and driven shafts is varied in a continuous, smooth manner within limits defining the ratio range of the variator. Typically, although not necessarily, this range is from a reduction ratio to its inverse overdrive ratio.

In recent years considerable work has been directed to the application of a CVT to the driveline of an automotive vehicle. Examples of such CVTs are disclosed in U.S. Pat. No. 2,933,952 issued Apr. 26, 1960 and U.S. Pat. No. 3,479,908 issued Nov. 25, 1969. Each of these patents discloses a split-path CVT having a low range providing low-speed, high-torque drive in both the forward and reverse directions, but only one high range providing high-speed, low-torque drive in the forward direction. U.S. Pat. No. 3,340,749 issued Sept. 12, 1967 discloses a split-path CVT providing a plurality of high ranges. However, this patent does not disclose a synchronous shift point at which the transmission may be shifted from any one of the drive ranges to any other. Rather, the drive ranges must be engaged sequentially in order to provide a smooth flow of power.

There remains a need in the art for a CVT which allows a vehicle operator to shift from any drive range directly to any other drive range. In particular, it would desirable for the operator to have the option of shifting from a low range either to a first, performance high range suitable for city driving or to a second, economy high range suitable for highway driving.

SUMMARY OF THE INVENTION

This invention is directed to meeting this need. To that end, there is disclosed herein a continuously variable transmission with synchronous shift. The transmission includes an input, an output, a fixed-ratio drive mechanism and a variator in driven relationship with the input, and a planetary gear assembly including a sun gear member, a ring gear member, a carrier member, and a plurality of planet gears supported by the carrier member in meshing relationship with the sun and ring gear members. First clutch means is provided for engaging the variator selectively with two of the members, second clutch means is provided for engaging the mechanism selectively with two of the members and for disengaging the mechanism therefrom, and third clutch means is provided for engaging two of the members selectively with the output.

BRIEF DESCRIPTION OF THE DRAWINGS

The objects and advantages of this invention will become apparent to those skilled in the art upon careful consideration of the specification herein, including the drawings, wherein:

FIG. 2 is a chart illustrating the position of the clutches of the CVT in establishing the ranges provided thereby;

FIG. 3 is a graph, simplified in the interest of clarity, illustrating the relationship of the variator speed ratio to the transmission speed ratio in each drive range;

FIG. 4a is a schematic diagram illustrating the CVT in the low range;

FIG. 4b is a schematic diagram illustrating the CVT in the first high range; and FIG. 4c is a schematic diagram illustrating the CVT in the second high range.

Figure 1:
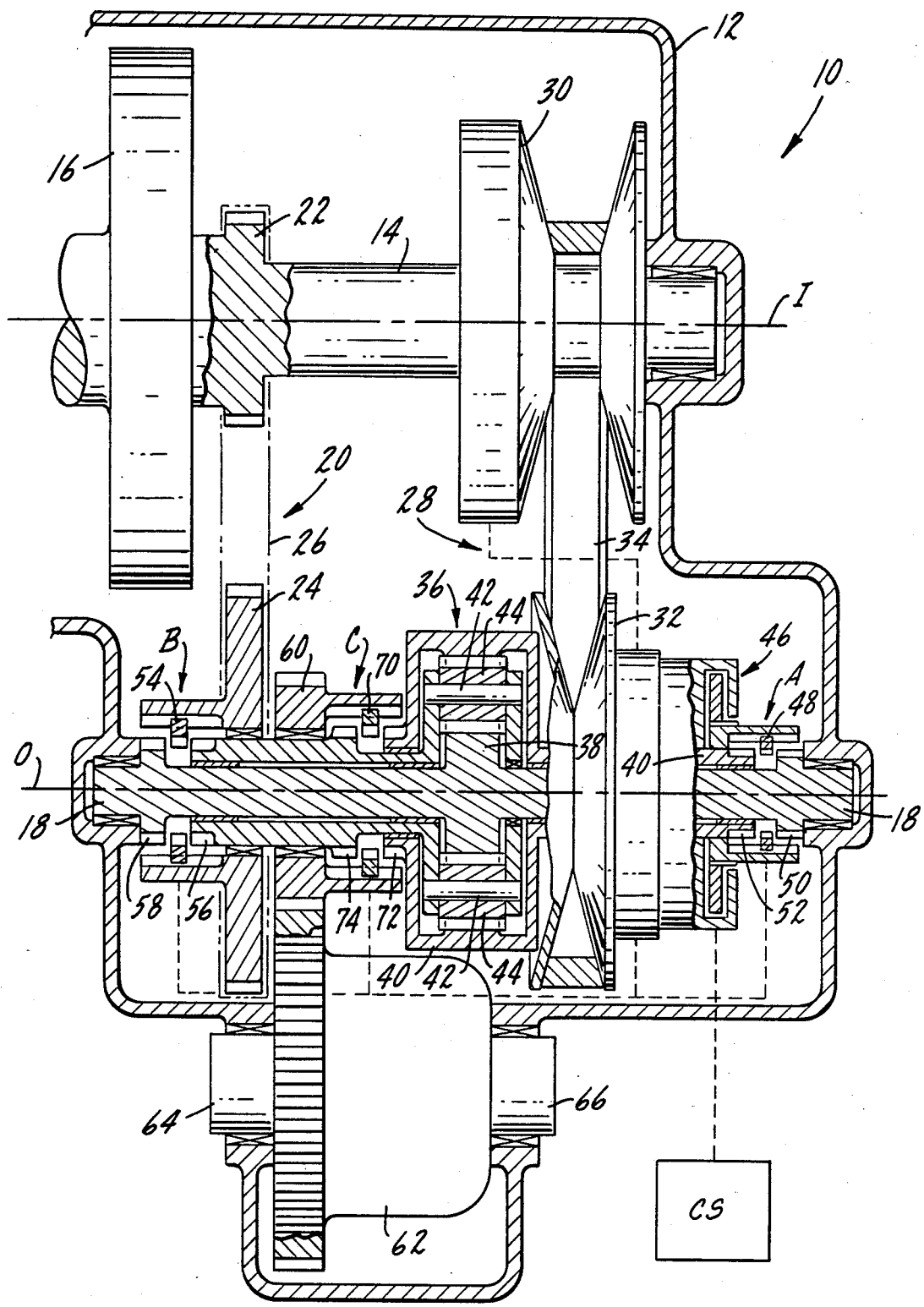
FIG. 1 is a sectional view of the CVT of this invention showing its components at the synchronous shift point with the clutches disengaged.

While this invention is susceptible to embodiment in many different forms, the preferred embodiment is shown in the drawings and described in detail. It should be understood that the present disclosure is considered to be an exemplification of the principles of the invention, and is not intended to limit the invention to this embodiment.

DESCRIPTION OF THE PREFERRED EMBODIMENT

Referring now to FIG. 1 in greater detail, the preferred embodiment of this invention incorporates a CVT 10 having a transmission housing 12. An input or drive shaft 14 is journalled for rotation in housing 12 on a first, input or drive axis I. Drive shaft 14 is adapted to receive power through a flywheel 16 from the engine of an associated automotive vehicle (not shown). A driven shaft 18 also is journalled for rotation in housing 12 on a second, output or driven axis O.

A fixed-ratio drive mechanism 20 may be a chain drive train or the like. Mechanism 20 includes a drive element 22 in the form of a sprocket rotatable with drive shaft 14 on axis I, a driven element 24 in the form of a sprocket journalled for rotation relative to driven shaft 18 on axis O, and a chain 26 coupling sprockets 22 and 24. By way of example, it is assumed that mechanism 20 provides a 0.5 reduction speed ratio.

A variator 28 includes a variable drive pulley 30 rotatable with drive shaft 14 on axis I, and a variable driven pulley 32 journalled for rotation relative to driven shaft 18 on axis O. A suitable belt 34 or the like couples pulleys 30 and 32. The pitch radii of pulleys 30 and 32 may be changed inversely such that variator 28 provides a drive ratio which is continously variable between predetermined limits. These limits preferably are a ratio substantially equal to the ratio of mechanism 20, in this example 0.5 reduction, and its inverse, 2.0 overdrive.

A planetary gear assembly 36 includes a sun gear member 38 rotatable with driven shaft 18 on axis O, a ring gear member 40 rotatable relative to shaft 18 on axis O, a carrier member 42 rotatable relative to shaft 18 on axis O, and a plurality of planet gears 44 supported by carrier 42 in meshing relationship with sun gear 38 and ring gear 40. In the configuration of the preferred form of the invention, the ratio of sun gear teeth to ring gear teeth is substantially numerically equal to the ratio of mechanism 20, in this example 0.5 reduction.

In the preferred form of the invention a friction clutch 46 is provided for engaging driven pulley 32 with a first clutch A. Clutch A, for example a jaw clutch, includes a toothed member 48 which may be shifted from the free, disengaged position shown in FIG. 1 either to the right into engagement with toothed portion 50 of driven shaft 18 or to the left into engagement with toothed portion 52 of ring gear 40.

Driven sprocket 24 is engaged with a second clutch B. Clutch B, for example a jaw clutch, includes a toothed member 54 which may be shifted from the free, disengaged position shown in FIG. 1 to the right into engagement with toothed portion 56 of carrier 42 or to the left into engagement with toothed portion 58 of driven shaft 18.

An output gear 60 or the like is in driving relationship with a differential 62. Differential 62 is adapted to direct power to axles 64 and 66 of the associated vehicle.

Output gear 60 is engaged with a third clutch C. Clutch C, for example a jaw clutch, includes a toothed member 70 which may be shifted from the free, disengaged position shown in FIG. 1 to the right into engagement with toothed portion 72 of ring gear 40 or to the left into engagement with toothed portion 74 of carrier 42.

As shown in FIGS. 1, 2 and 4a, the low range is established by shifting clutches A, B and C to the right. Clutch A engages driven pulley 32 with driven shaft 18 and sun gear 38, clutch B engages driven sprocket 24 with carrier 42, and clutch C engages ring gear 40 with output gear 60.

Based on the assumptions noted above, mechanism 20 provides a 0.5 reduction ratio, and carrier 42 rotates at 0.5 times input speed. When the pitch radii of pulleys 30 and 32 are such that variator 28 provides a 1.5 overdrive ratio, shaft 18 and sun gear 38 rotate at 1.5 times input speed. The resulting speed of ring gear 40 and output gear 60 is zero. This is illustrated as the neutral point N in the graph of FIG. 3. As this is a geared neutral condition, it would be desirable to disengage clutch 46 at this point in order to avoid vehicle creep.

As illustrated in FIG. 3, in the low range the ratio of variator 28 may be varied in one direction from 2.0 overdrive to 0.5 reduction. From 2.0 to 1.5 overdrive, CVT 10 provides reverse drive at a transmission ratio which varies from −0.25 times input speed to zero. From 1.5 overdrive to 0.5 reduction, CVT 10 provides forward drive at a transmission ratio which varies from zero to 0.5 times input speed.

When the ratio of variator 28 is 0.5 reduction, CVT 10 is at its synchronous shift point S. At this point all of the components on axis O are rotating in synchronism at 0.5 times input speed. CVT 10 may be shifted from any range to any other range using simple jaw clutches or the like. Synchronizers are not required.

As shown in FIGS. 1, 2, 3 and 4b, at synchronous shift point S CVT 10 may be shifted from low to the first high range (high-1) by shifting clutches A, B and C respectively to the left. Clutch A engages driven pulley 32 with ring gear 40, clutch B engages driven sprocket 24 with driven shaft 18 and sun gear 38, and clutch C engages carrier 42 with output gear 60. In the first high range the ratio of variator 28 may be varied in the opposite direction from 0.5 reduction to 2.0 overdrive. CVT 10 provides forward drive at a transmission ratio which varies from 0.5 to 1.5 times input speed.

As shown in FIGS. 1, 2, 3 and 4c, at synchronous shift point S CVT 10 may be shifted from low to the second high range (high-2) by shifting clutch A to the left, engaging driven pulley 32 with ring gear 40, shifting clutch B to the free position, disengaging driven sprocket 24, and shifting clutch C to the right, engaging ring gear 40 with output gear 60. In the second high range the ratio of variator may be varied in the opposite direction from 0.5 reduction to 2.0 overdrive. CVT 10 provides forward drive at a transmission ratio which varies from 0.5 to 2.0 times input speed.

The first high range is suitable for city driving, while the second high range is suitable for highway driving. Although it is contemplated that CVT 10 will be shifted between the low range and either one of the high ranges, it could be shifted directly from one high range to the other if operating conditions make this desirable.

A suitable control system CS is provided for changing the pitch radii of pulleys 30 and 32 inversely so as to vary the ratio range of variator 28 between its reduction and overdrive limits, for engaging and disengaging friction clutch 46 at neutral point N, and for shifting clutches A, B and C at synchronous shift point S.

Thus it will be seen that this invention is directed to a CVT having a plurality of drive ranges. The transmission may be shifted from any drive range to any other drive range at a synchronous shift point. A low range provides low-speed, high-torque drive on either side of neutral. In the low range the CVT has a split-path configuration; that is, torque is delivered through both a fixed-ratio drive mechanism and a variator. A first high range provides high-speed, low-torque drive. In this range the CVT also has a split-path configuration. A second high range also provides high-speed, low-torque drive, but with a higher maximum overdrive ratio than the first high range. In this range the CVT has a single-path configuration. The fixed-ratio drive mechanism is disengaged, and all of the torque is delivered through the variator.

The numerical values for the various ratios are given by way of example. The designer has wide latitude in selecting other numerical values which will satisfy his particular requirements.

It should be understood that while the preferred embodiment of this invention has been shown and described, it is to be considered as illustrative and may be modified by those skilled in the art. It is intended that the claims herein cover all such modifications as may fall within the spirit and scope of the invention.

What is claimed is:

1. A continuously variable transmission with synchronous shift comprising an input, a fixed-ratio drive mechanism in driven relationship with said input, a variator in driven relationship with said input, a planetary gear assembly including a sun gear member, a ring gear member, a carrier member, and a plurality of planet gears supported by said carrier member in meshing relationship with said sun and ring gear members, an output, first clutch means for engaging said variator selectively with two of said members, second clutch means for engaging said mechanism selectively with two of said members and for disengaging said mechanism therefrom, and third clutch means for engaging two of said members selectively with said output.

2. The continuously variable transmission of claim 1, said mechanism having a reduction ratio, said variator having a ratio range including a ratio substantially equal to said reduction ratio, the ratio of sun gear teeth to ring gear teeth being substantially numerically equal to said reduction ratio, said first clutch means engaging said variator selectively with said sun gear member and ring gear member, said second clutch means engaging said mechanism selectively with said carrier member and sun gear member, and said third clutch means engaging said ring gear member and carrier member selectively with said output.

3. The continuously variable transmission of claim 2, further comprising additional clutch means for disengaging said variator from said sun and ring gear members.

4. The continuously variable transmission of claim 3, said additional clutch means including friction clutch means for disengaging said variator from said first clutch means when the ratio of said variator is substantially equal to said reduction ratio.

5. A continuously variable transmission with synchronous shift comprising a rotatable drive shaft, a fixed-ratio drive mechanism including drive and driven elements, said drive element being rotatable in response to rotation of said drive shaft, a variator having a ratio range that is continuously variable between predetermined limits, said variator including variable drive and driven pulleys, said drive pulley being rotatable in response to rotation of said drive shaft, a planetary gear assembly including a sun gear member, a ring gear member, a carrier member, and a plurality of planet gears supported by said carrier member in meshing relationship with said sun and ring gear members, a rotatable output, first clutch means for engaging said driven pulley selectively with two of said members, second clutch means for engaging said driven element selectively with two of said members and for disengaging said driven element therefrom, and third clutch means for engaging two of said members selectively with said output, said transmission being constructed and arranged such that said driven element, driven pulley, members, and output rotate in synchronism when the ratio of said variator is substantially equal to the ratio of said fixed-ratio drive mechanism.

6. The continuously variable transmission of claim 5, said drive shaft being rotatable on a first axis, said drive element and drive pulley being rotatable with said drive shaft on said first axis, a driven shaft rotatable on a second axis, said sun gear member being rotatable with said driven shaft on said second axis, said driven element, driven pulley, ring gear member, carrier member and output being rotatable relative to said driven shaft on said second axis, said first clutch means engaging said driven pulley selectively with said driven shaft and ring gear member, said second clutch means engaging said driven element selectively with said carrier member and driven shaft, and said third clutch means engaging said ring gear member and carrier member selectively with said output.

7. The continuously variable transmission of claim 6, further comprising additional clutch means for disengaging said variator from said sun and ring gear members.

8. The continuously variable transmission of claim 7, said additional clutch means including friction clutch means for disengaging said variator from said first clutch means when the ratio of said variator is substantially equal to said reduction ratio.

9. A continuously variable transmission with synchronous shift comprising an input, fixed-ratio drive means in driven relationship with said input, variator means in driven relationship with said input, an output, planetary gear means adapted for driven engagement with said fixed-ratio drive means and variator means, said planetary gear means being adapted for driving engagement with said output, and clutch means for selectively engaging said planetary gear means with said fixed-ratio drive means, variator means and output so as to establish selectively a low-speed range, a first high-speed range and a second high-speed range, said transmission being constructed and arranged such that said ranges converge at a synchronous shift point, whereby said transmission may be shifted directly from any range to any other range at said synchronous shift point.

10. The continuously variable transmission of claim 9, said variator having a ratio range including a ratio substantially equal to said fixed ratio at said synchronous shift point.

11. The continuously variable transmission of claim 10, said fixed ratio being a reduction ratio.

12. The continuously variable transmission of claim 11, said reduction ratio being one limit of the ratio range of said variator, the other limit being an overdrive ratio that is substantially the inverse of said reduction ratio.

* * * * *